US010137546B2

(12) United States Patent
Hecht et al.

(10) Patent No.: US 10,137,546 B2
(45) Date of Patent: Nov. 27, 2018

(54) SWITCHABLE GEAR DRIVE FOR A HANDHELD POWER TOOL

(75) Inventors: Joachim Hecht, Magstadt (DE); Martin Kraus, Filderstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 582 days.

(21) Appl. No.: 13/594,379

(22) Filed: Aug. 24, 2012

(65) Prior Publication Data
US 2013/0047762 A1 Feb. 28, 2013

(30) Foreign Application Priority Data

Aug. 26, 2011 (DE) .................... 10 2011 081 661

(51) Int. Cl.
*E02D 7/02* (2006.01)
*B23Q 5/14* (2006.01)
*B25B 21/00* (2006.01)
*B25F 5/00* (2006.01)

(52) U.S. Cl.
CPC ............. *B23Q 5/142* (2013.01); *B25B 21/00* (2013.01); *B25F 5/001* (2013.01); *Y10T 74/19242* (2015.01)

(58) Field of Classification Search
CPC . B25F 5/001; B25F 1/02; B25B 21/00; B25B 23/14; B25B 21/008; B25D 16/006; B25D 2216/0084; B25D 2250/165; B23B 45/008; F16D 11/14; F16H 3/62; F16H 1/28; F16H 2200/2035; F16H 27/06; F16H 3/06

USPC ..................................................... 173/48, 213
See application file for complete search history.

(56) References Cited

U.S. PATENT DOCUMENTS

| 4,691,786 | A | * | 9/1987 | Fujita | B25B 21/001 173/176 |
| 4,892,013 | A | * | 1/1990 | Satoh | B25B 21/008 173/178 |
| 5,692,575 | A | * | 12/1997 | Hellstrom | B25B 21/00 173/216 |
| 5,897,454 | A | * | 4/1999 | Cannaliato | F16H 61/0293 475/263 |
| 6,196,332 | B1 | * | 3/2001 | Albert | B25B 21/00 173/176 |

(Continued)

FOREIGN PATENT DOCUMENTS

| CN | 101443161 A | 5/2009 |
| CN | 201253843 Y | 6/2009 |

(Continued)

*Primary Examiner* — Robert Long
(74) *Attorney, Agent, or Firm* — Norton Rose Fulbright US LLP; Gerard Messina

(57) ABSTRACT

A switchable gear drive for a handheld power tool has two gears which are to be engaged via an adjustable switching member, the switching member being in a locked position with a retaining ring which is fixedly held on a housing in a first gear and being in an unlocked position with the retaining ring in a second gear. Furthermore, a spindle for accommodating a tool is drivable by an axially spring-loaded gear wheel supported in the housing, the gear wheel being axially supported on the retaining ring on the side diametrically opposed to the switching member. The retaining ring is designed as a circumferential, closed ring.

9 Claims, 2 Drawing Sheets

(56) References Cited

U.S. PATENT DOCUMENTS

| | | | | |
|---|---|---|---|---|
| 7,121,359 B2* | 10/2006 | Frauhammer | ........ | B25D 16/006 173/104 |
| 7,201,235 B2* | 4/2007 | Umemura | ............. | B23B 45/008 173/104 |
| 7,537,540 B2* | 5/2009 | Baumann | .............. | B23B 45/008 173/216 |
| 7,644,783 B2* | 1/2010 | Roberts | ................... | B25B 21/00 173/178 |
| 7,766,140 B2* | 8/2010 | Ponson | ................... | F16D 7/021 192/110 B |
| 8,251,158 B2* | 8/2012 | Tomayko | .............. | B23B 45/008 173/11 |
| 2004/0020669 A1* | 2/2004 | Spielmann et al. | .......... | 173/178 |
| 2009/0003950 A1* | 1/2009 | Mok et al. | .................... | 408/240 |
| 2009/0098971 A1* | 4/2009 | Ho et al. | ........................ | 475/153 |
| 2009/0101376 A1* | 4/2009 | Walker et al. | .................. | 173/47 |
| 2010/0213240 A1* | 8/2010 | Kostrzewski | .............. | 227/180.1 |
| 2010/0326686 A1* | 12/2010 | Leong et al. | .................... | 173/48 |
| 2011/0147021 A1* | 6/2011 | Schaal et al. | .................... | 173/47 |
| 2011/0207571 A1* | 8/2011 | Hecht | ...................... | B25B 21/00 475/269 |
| 2011/0220379 A1* | 9/2011 | Bixler | ..................... | B25F 5/001 173/216 |
| 2012/0090863 A1* | 4/2012 | Puzio et al. | ....................... | 173/2 |
| 2013/0025899 A1* | 1/2013 | Kuehne | ................... | B25F 5/001 173/216 |

FOREIGN PATENT DOCUMENTS

| | | |
|---|---|---|
| CN | 101745899 A | 6/2010 |
| DE | 10 2008 041 599 | 3/2010 |
| EP | 2343159 A1 | 7/2011 |
| WO | 2010054916 A1 | 5/2010 |

* cited by examiner

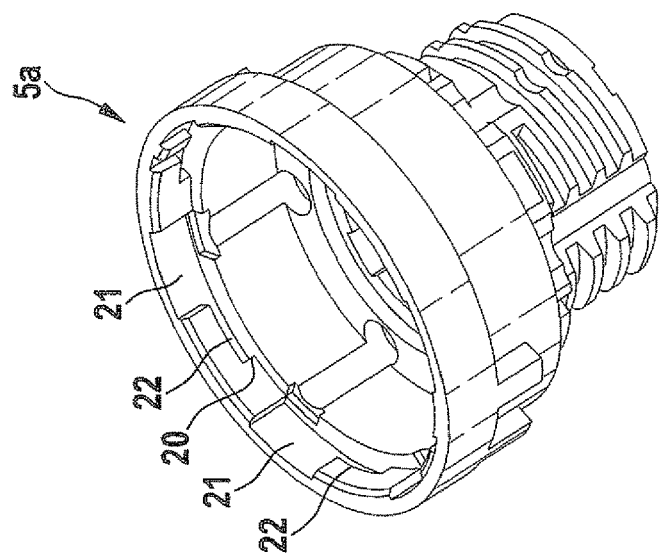
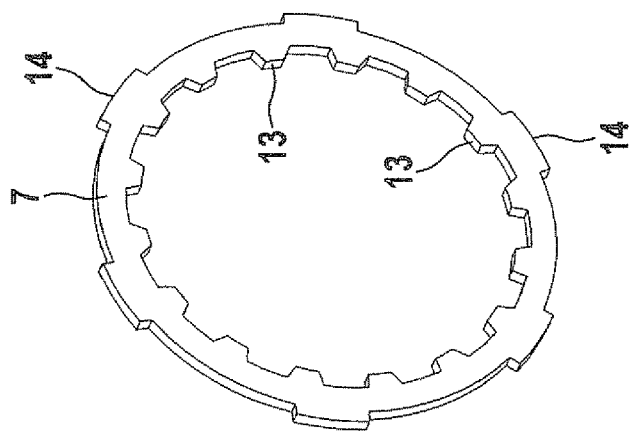
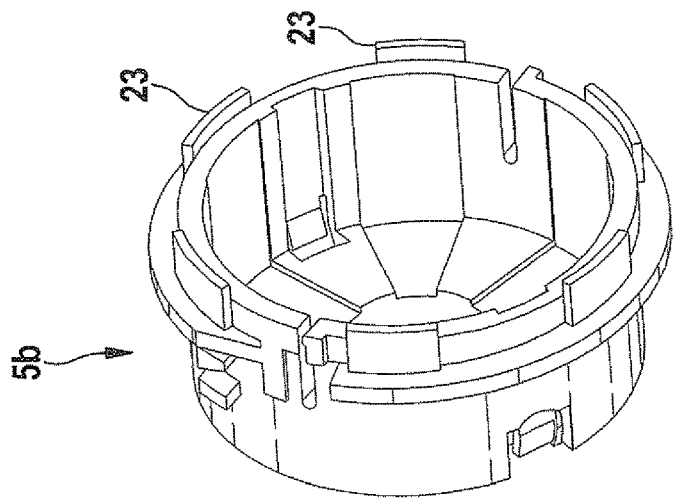
Fig. 2

SWITCHABLE GEAR DRIVE FOR A HANDHELD POWER TOOL

RELATED APPLICATION INFORMATION

The present application claims priority to and the benefit of German patent application no. 10 2011 081 661.5, which was filed in Germany on Aug. 26, 2011, the disclosure of which is incorporated herein by reference.

FIELD OF THE INVENTION

The present invention relates to a switchable gear drive for a handheld power tool.

BACKGROUND INFORMATION

Patent document DE 10 2008 041 599 A1 discusses a cordless screwdriver which has an electric motor and a multistage planetary gear set as the drive, the planetary gear being used to drive a tool receptacle having a drill. The planetary gear set has two gears having a slow rotational speed and a high torque and a higher rotational speed and a lower torque. To switch between the gears, a switching member is adjusted between a locked position fixed in a housing and an unlocked position. In the locked position, the switching member is held on a retaining element designed as an open ring, which is fixedly situated in the housing and is attached to a housing component with the aid of mounting eyes and form fit elements. The retaining element is also used to support an axially spring-loaded gear wheel via which a torque limiting function is implemented.

SUMMARY OF THE INVENTION

An object of the exemplary embodiments and/or exemplary methods of the present invention is to provide a compact switchable gear drive for a handheld power tool, using a simple structural arrangement, the switchable gear drive being suitable for transmitting high torques.

According to the exemplary embodiments and/or exemplary methods of the present invention, this object may be achieved by the features described herein. The further descriptions herein specify advantageous refinements.

The switchable gear drive is used in handheld power tools, for example in cordless drills or cordless screwdrivers, and has at least two gears between which it is possible to switch. A defined gear ratio having an assigned torque between the electric drive motor and a spindle for accommodating the tool is assigned to each gear. A switching member, which is held in a locked position by a retaining ring fixed in a housing in the first gear, is used to switch between the gears, so that the switching member is also fixedly secured in the housing in this position. In a second switching position, which corresponds to the second gear, the switching member is in the unlocked position, in particular in an unlocked position with a planet carrier of the gear drive designed as a planetary gear set, so that the switching member, which is rotatably mounted in the housing, is able to execute a rotational movement.

Furthermore, one or multiple elastic elements, which apply an elastic force axially to a gear wheel of the gear drive supported in the housing, is/are provided for limiting the torque in the transmission path between the gear drive and the spindle. Depending on the spring loading, a more or less high torque is transmitted to the spindle. The elastic element presses the gear wheel axially against the retaining ring, which is then assigned the function of placing the switching member in a locked position in which the switching member is fixedly secured to the housing for switching to one of the gears of the gear drive, on the one hand, and the function of supporting the gear wheel, to which force is axially applied by the elastic element, on the other hand.

The retaining ring has a circumferential and closed design, i.e., without interruptions, and therefore has a high stability, so that the retaining ring deforms less or not at all under load, and good stability is also ensured even at high torques. In the gear having a low rotational speed and high torque, in particular, the rigidity of the retaining ring is sufficient to prevent a deformation of the ring. On the whole, higher torques may be transmitted in this manner.

According to another advantageous embodiment, the retaining ring is accommodated in a housing component of the handheld power tool in a form-fit manner axially in both directions. The retaining ring, to which force is applied on both end faces, is thus held securely on the housing component in the axial direction, no further retaining or mounting measures being necessary, in principle, for holding the retaining ring on the housing component, due to the form fit.

According to another embodiment, it is provided that the retaining ring is held on the housing component in the manner of a bayonet lock, by introducing an axial groove and a circumferential groove connected to the axial groove into the inner wall of the housing component accommodating the retaining ring, the grooves being used to accommodate a radially projecting locking element on the outer circumference of the retaining ring. For assembly, the retaining ring is initially inserted together with the radial locking element axially into the axial groove in the inner wall of the housing component until it reaches the base of the axial groove. The retaining ring may then be rotated until the locking element enters the circumferential groove in the inner wall of the housing component. The axial, form-fit retaining action in both axial directions is implemented due to the position of the locking element in the circumferential groove.

According to another advantageous embodiment, a second housing component is provided which is insertable into the first housing component which is provided with the axial and circumferential grooves in the inner wall. The housing components form, for example, a gear drive housing and a clutch housing, the retaining ring advantageously being insertable into the clutch housing. In principle, however, a positioning in the gear housing is also possible.

The second housing component advantageously has an axially protruding retaining projection on its end face, which is insertable into the axial groove in the inner wall of the first housing component. The axial extension of the retaining projection on the second housing component advantageously corresponds to the axial extension of the axial groove in the inner wall of the first housing component, so that the axial retaining projection is fully accommodated in the axial groove in the assembled state. This prevents the retaining ring, whose radial locking element is accommodated in the circumferential groove, from rotating back into the area of the axial groove, so that the position of the retaining ring is secured in a form-fit manner in both the circumferential direction and the axial direction. An inadvertent, unintentional movement of the retaining ring in the circumferential or rotational direction, or even release from the assembled position in the housing component, is reliably prevented.

For reasons of symmetrical distribution of force and torque, it is advantageous for multiple circumferential and axial grooves distributed over the circumference to be introduced into the housing component, these grooves each being assigned a locking element on the retaining ring. The circumferential grooves each extend over a limited angle segment, which is dimensioned in such a way that the locking element on the retaining ring is accommodated in the circumferential groove and may thereby be secured axially in both directions. The locking element on the retaining ring is advantageously fully accommodated in the circumferential groove in the assembled position.

Multiple retaining projections, which protrude axially over the end face of the second housing component, are also advantageously distributed over the circumference of the second housing component. One axially protruding retaining projection on the second housing component is assigned to each axial groove in the first housing component.

Additional advantages and advantageous embodiments are described in the further descriptions herein, the description of the figures and the drawings.

BRIEF DESCRIPTION OF THE DRAWINGS

FIG. 2 shows a perspective view of two housing components for accommodating the gear drive and a retaining ring located therebetween.

DETAILED DESCRIPTION

Figure 1:
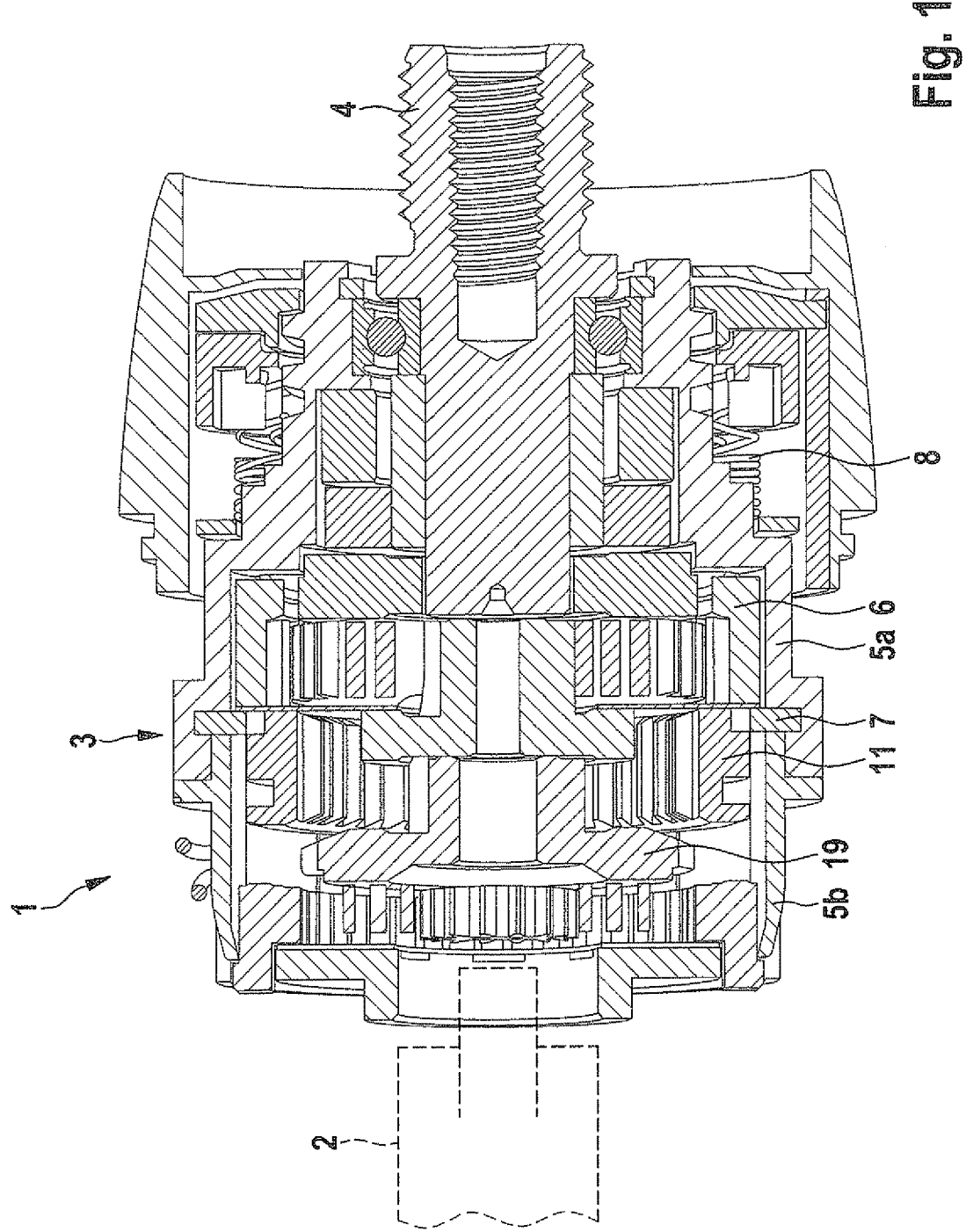
FIG. 1 shows a sectional view of a handheld power tool in the area of the gear drive.

In the figures, identical components are provided with identical reference numerals.

FIG. 1 shows the most important components of a handheld power tool 1, which is, for example, a cordless drill or a cordless screwdriver. Handheld power tool 1 has an electric drive motor 2 whose motor shaft, which is illustrated only as an outline, drives a gear drive 3, which is coupled to a spindle 4 for accommodating a tool. Gear drive 3 as well as a torque clutch is located in a housing which has a first housing component 5a and a second housing component 5b, of which first housing component 5a forms a clutch housing on the side of spindle 4, and second housing component 5b forms a gear drive housing on the side of drive motor 2.

A retaining ring 7, on which a gear wheel 6 is axially supported on the side of spindle 4, is accommodated between first and second housing components 5a, 5b in a form-fit manner, force being applied to gear wheel 6 axially against retaining ring 7 by an elastic element 8. A disk may be situated between gear wheel 6 and retaining ring 7, designs without a disk of this type also being possible.

On the side facing away from retaining ring 7, the foot of elastic element 8 may be held on an adjusting ring which is screwed onto first housing component 5a and whose axial position is adjustable relative to first housing component 5a by rotation. Elastic element 8, including a blocking member which may be provided between the elastic element and the gear wheel, gear wheel 6 as well as an adjusting ring which may be provided for adjusting the foot, form a torque clutch for limiting the maximum transmittable torque. Via the axial adjustment of the adjusting ring, the foot of the elastic element, and thus the pretension, is adjusted, which makes it possible to influence the transmittable torque.

A switching ring gear 11, which is mounted in housing 5a, 5b to permit axial movement in the axial direction and which is displaceable between a locked position with retaining ring 7 and an unlocked position located at an axial distance from retaining ring 7, is in contact with the end face of retaining ring 7 on the side facing away from gear wheel 6. In the locked position, switching ring gear 11 is locked with retaining ring 7 and is thus held on housing 5a, 5b in a form-fit manner. In the unlocked position, the lock between switching ring gear 11 and retaining ring 7 is released; at the same time, a connection exists to a planet carrier 19, which is part of gear drive 3. The locked position and the unlocked position of switching ring gear 11 each represent gears of the gear drive for implementing a different gear and torque ratio.

FIG. 2 shows a perspective representation of the two housing components 5a, 5b as well as retaining ring 7. Retaining ring 7 is designed as a closed, circumferential ring which may be made of metal and which has form fit elements 13 which extend radially to the inside on its inner circumference and locking elements 14 which extend radially to the outside on its outer circumference. A plurality of form fit elements 13 are distributed over the circumference on the inside. Multiple locking elements 14 are also provided on the outer circumference, albeit smaller in number than the number of form fit elements 13. Form fit elements 13 correspond to the form fit elements on gear wheel 6 (FIG. 1), in the assembled position, form fit elements 13 on retaining ring 7 and the form fit elements on gear wheel 6 being in the locked position.

For assembly, retaining ring 7 is inserted into first housing component 5a, which has a circumferential shoulder 20 which is adjacent to the end face on the inner wall and on which retaining ring 7 is supported. A plurality of axial grooves 21, which are distributed over the circumference, are introduced into the inner wall, each of which is connected to a circumferential groove 22. Circumferential groove 22 is located axially at the height of shoulder 20 and extends over a limited angle segment in the circumferential direction.

For assembly, retaining ring 7 is oriented in relation to first housing component 5a by its radially outwardly protruding locking elements 14 in such a way that locking elements 14 are aligned with axial grooves 21, so that retaining ring 7 is insertable axially into the end face of first housing component 5a until it reaches shoulder 20. Retaining ring 7 is subsequently rotated until locking elements 14 are inserted into adjoining circumferential grooves 22. In this way, retaining ring 7 is held axially in first housing component 5a in a form-fit manner in both axial directions.

Second housing component 5b has on its end face axially protruding retaining projections 23 which correspond to axial grooves 21 in first housing component 5a in terms of their number, position, width in the circumferential direction and axial extension. For assembly, second housing component 5b is placed on the end face of first housing component 5a after retaining ring 7 has been inserted, so that retaining projections 23 extend into axial grooves 21, and the end faces of retaining projections 23 rest on shoulder 20. This causes locking elements 14 of retaining ring 7 to be blocked in circumferential grooves 22, and they may not be adjusted in the direction of rotation, so that retaining ring 7 is secured in a form-fit manner in both axial directions and in both directions of rotation.

What is claimed is:

1. A switchable gear drive for a handheld power tool, comprising:
    at least two gears configured to be engaged via an axially adjustable switching member, the switching member being held in a locked position by a retaining element fixed in a housing in a first gear, and being held in an unlocked position with the retaining element in a second gear; and a spindle for driving a tool which is drivable by an axially spring-loaded gear wheel supported in the housing;

wherein the gear wheel is axially supported on the retaining element on a side facing a distal end of the spindle, and wherein the retaining element is a circumferential, closed retaining ring, wherein the retaining ring is accommodated in a first housing component of the handheld power tool such that it is held in a form-fitting manner in both axially directions, wherein an inner wall of the first housing component includes at least one circumferential groove for axially accommodating a radially protruding locking element on the outer circumference of the retaining ring in a form-fit manner, and wherein the circumferential groove is connected to an axial groove in the inner wall of the first housing component, wherein at least one of:
  form fit elements situated on the inner circumference of the retaining ring are distributed over more than half the inner circumference;
  radially protruding locking elements situated on the outer circumference of the retaining ring are distributed over more than half the outer circumference; or
  more than two radially protruding locking elements are situated on the outer circumference of the retaining ring.

2. The gear drive of claim 1, wherein a second housing component is insertable into the first housing component.

3. The gear drive of claim 2, wherein an axially protruding retaining projection, which is insertable into the axial groove, is situated on an end face of the second housing component.

4. The gear drive of claim 3, wherein an axial extension of the retaining projection corresponds to an axial extension of the axial groove.

5. The gear drive of claim 1, wherein multiple circumferential and axial grooves which are distributed over the circumference are introduced into the first housing component, to each of which one locking element on the retaining ring is assigned.

6. The gear drive of claim 1, wherein form fit elements which extend inwardly in the radial direction are situated on the inside of the retaining ring for supporting the gear wheel.

7. The gear drive of claim 1 wherein the first housing component accommodating the retaining ring is a clutch housing.

8. A handheld power tool, comprising:
  a switchable gear drive, including:
    at least two gears configured to be engaged via an axially adjustable switching member, the switching member being held in a locked position by a retaining element fixed in a housing in a first gear, and being held in an unlocked position with the retaining element in a second gear; and
    a spindle for driving a tool which is drivable by an axially spring-loaded gear wheel supported in the housing;
  wherein the gear wheel is axially supported on the retaining element on a side facing a distal end of the spindle, and wherein the retaining element is a circumferential, closed retaining ring,
  wherein the retaining ring is accommodated in a first housing component of the handheld power tool such that it is held in a form-fitting manner in both axially directions,
  wherein an inner wall of the first housing component includes at least one circumferential groove for axially accommodating a radially protruding locking element on the outer circumference of the retaining ring in a form-fit manner, and wherein the circumferential groove is connected to an axial groove in the inner wall of the first housing component,
  wherein at least one of:
    form fit elements situated on the inner circumference of the retaining ring are distributed over more than half the inner circumference;
    radially protruding locking elements situated on the outer circumference of the retaining ring are distributed over more than half the outer circumference; or
    more than two radially protruding locking elements are situated on the outer circumference of the retaining ring.

9. A handheld power tool including a switchable gear drive, comprising:
  a gear drive including at least two gears configured to be engaged via an axially adjustable switching member, the switching member being held in a locked position by a retaining element fixed in a housing in a first gear, and being held in an unlocked position with the retaining element in a second gear;
  a spindle for driving a tool, the spindle being driven by the gear drive; and
  a torque limiting unit for limiting the torque in the transmission path between the gear drive and the spindle, the torque limiting unit includes an axially spring-loaded gear wheel supported in the housing;
  wherein the gear wheel is axially supported on the retaining element on a side facing a distal end of the spindle, and wherein the retaining element is a circumferential, closed retaining ring,
  wherein the retaining ring is accommodated in a first housing component of the handheld power tool such that it is held in a form-fitting in both axially directions,
  wherein an inner wall of the first housing component includes at least one circumferential groove for axially accommodating a radially protruding locking element on the outer circumference of the retaining ring in a form-fit manner, and wherein the circumferential groove is connected to an axial groove in the inner wall of the first housing component,
  wherein at least one of:
    form fit elements situated on the inner circumference of the retaining ring are distributed over more than half the inner circumference;
    radially protruding locking elements situated on the outer circumference of the retaining ring are distributed over more than half the outer circumference; or
  more than two radially protruding locking elements are situated on the outer circumference of the retaining ring.

* * * * *